Dec. 14, 1971  C. F. MILLER  3,626,590
METHODS AND APPARATUS FOR ACCOMPLISHING ELECTRICAL WIRING
Filed May 28, 1968  2 Sheets-Sheet 1

INVENTOR.
CHARLES FREDICK MILLER
BY
ATTORNEY

Dec. 14, 1971  C. F. MILLER  3,626,590
METHODS AND APPARATUS FOR ACCOMPLISHING ELECTRICAL WIRING
Filed May 28, 1968  2 Sheets-Sheet 2
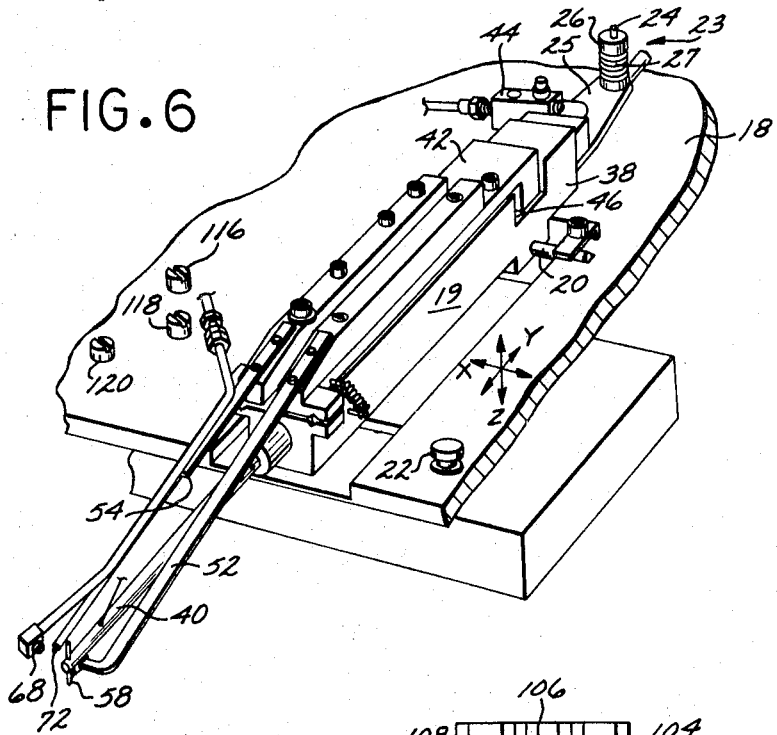
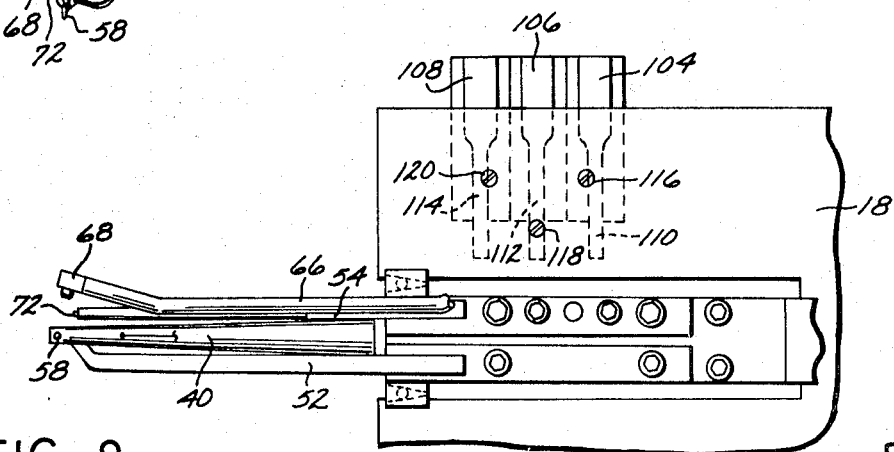
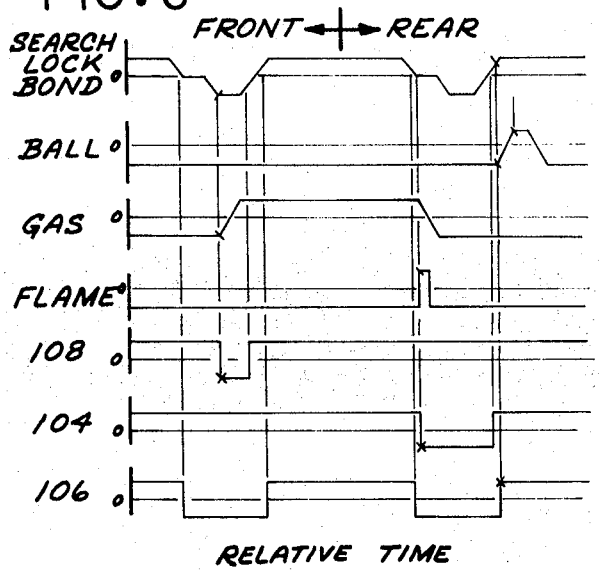
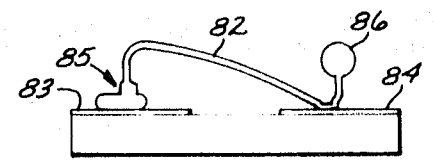
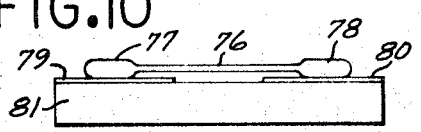
INVENTOR.
CHARLES FREDICK MILLER
BY
ATTORNEY United States Patent Office 3,626,590
Patented Dec. 14, 1971

3,626,590
METHODS AND APPARATUS FOR ACCOMPLISHING ELECTRICAL WIRING
Charles Fredrick Miller, 2519 Strong Place,
Anaheim, Calif. 92806
Filed May 28, 1968, Ser. No. 732,629
Int. Cl. B23k 21/00; H01b 13/00
U.S. Cl. 29—624                          5 Claims

ABSTRACT OF THE DISCLOSURE

This invention relates to methods and apparatus for accomplishing electrical wiring. In the method the electrical conductor is formed to selected length with an integral enlargement at each end comprising conductor material. One of these enlargements is placed over one circuit point and the other enlargement is placed over a second circuit point which is to be electrically connected to the first. Bonding force is applied to each enlargement until the conductor is bonded to the selected circuit point. Practice of the invention is facilitated by the employment of a bonding apparatus in which the tool by which bonding force is applied to the enlarged conductor end is movable over a work station and in which provision is made for guiding the conductor wire so that one of its ends, together with the enlargement at that end, is positioned in the line of action of the bonding tool and is movable with it over the work station. Bonding energy is applied to bond that enlargement to a first circuit point so that the end of the wire is fixed to the work. Then the tools are moved over the surface of the work to the second bonding point where the conductor wire is severed by the application of heat in a way that utilizes surface tension of the molten end of the conductor wire to form a ball of conduction material at the severed end of the conductor, the other end of which is already connected to the work. A novel apparatus for accomplishing this step is disclosed and in the form specifically described includes a device for directing a flame at the wire so that it is severed adjacent the bonding tool whereby the ball formed at the end of the conductor lies in the path of action of the bonding tool and so the ball formed at the end of the remaining stock of conductor wire is formed out of line of action of the bonding tool. The method of the invention, when practiced with such an apparatus, includes the step of positioning the stock of wire with the ball formed at its end such that the ball lies in the line of action of the bonding tool. Thus, the ball is in proper position as the ball and bonding tool are moved together over the work piece. The apparatus of the invention is capable of practicing all of the steps of the method and if certain steps are accomplished manually or by other means, the apparatus of the invention is capable of conducting the remaining steps of the method. The specific apparatus selected for illustration in the drawing and detail description in the specification is arranged to accomplish bonding by a thermo-compressive method.

---

This invention relates to improvements in methods and apparatus for accomplishing electrical wiring. It relates particularly to methods and means for preparing conductors for connection from one point in an electrical circuit to another, for positioning such conductors in electrical circuits, and for accomplishing bonding by thermocompression at the connection points.

An object of the invention is to provide improved methods and means for wiring electrical circuits. One object is to provide an improved method and means for preparing a conductor for interconnection between two circuit points and another object is to provide an improved method and means for bonding the conductor so produced to a circuit point at each end. While the invention is applicable, and its advantages are realized, in a wide variety of circuitry forms including those using large diameter wires and those in which conductors extend between discrete terminal structures, the invention is especially advantageous in applications involving microcircuitry, integrated circuitry, and semi-conductor surfaces. The electrical conductor wire employed in those applications sometimes has cross-sectional area as small as one circular mil. Such wires are so small that special lighting is often required to make them visible. The tasks of cutting the conductor to length, of preparing the conductor ends for bonding in the circuit, and of positioning the conductor relative to the circuit are accomplished in the invention according to novel steps whereby wiring with such fine wire can be accomplished accurately, neatly and in relatively short time whereby to facilitate production and minimize cost. The realization of these advantages is another object of the invention.

No less importantly, and in accordance with another object of the invention, the invention is capable of producing a wired construction which permits improved electrical and mechanical bonding of the conductors to the circuit and which minimizes the probability of failures of the kind that are induced by vibration and shock. Thus, another object of the invention is to provide circuit structures having a very high order of reliability and to do that, in part, by the elimination of "tails" of conductor material which extend beyond the bonding point and by the elimination of need for the conductor to extend perpendicularly away from the bonding point.

In a broader sense, the method of the invention is useful, and many of its objectives are realized, regardless of whether the bonding of the conductor in the circuit is accomplished by thermocompression, resistance welding, eutectic bonding or other solid state bondings processes. However the invention is particularly well suited to thermocompression bonding and another object of the invention is to provide an improved wiring and thermocompression bonding method and means. In this connection, it is an object of the invention to provide a means for effecting thermocompression bonding which results in minimum distortion and stress of the conductor adjacent the bond point. Gold and aluminum are commonly used conductor materials in semiconductor devices and in integrated circuitry and it is common to use gold wire as the conductor. The gold to aluminum connection is particularly troublesome. When gold and aluminum are heated and pressed together, one or more gold-aluminum alloys occur at the interface of the two metals. In general, when a mass of gold is pressed down upon a surface of aluminum, the surfaces of the two metals form a wedge-shaped notch between them which extends entirely about the area over which they are joined. The aluminum rich alloys, $AuAl_2$ and $AuAl$, tend to form in this wedge region and not infrequently the bond is broken, at least electrically on an intermittent basis, in zones occupied by this aluminum rich alloy. Another failure mechanism which is fairly prevalent in thermocompression bonds between gold and aluminum is void formation due to mass transfer at phase interfaces. This transfer, which is known as the Kirkendall effect, often results in an annular void extending entirely around the weld at its periphery. Failures traceable to these mechanisms tend to increase with increases in the temperature employed in the thermocompressive bond. It appears that defective welds occur less frequently if weld pressure is increased while temperature is decreased provided that the materials at the proposed weld are heated to a temperature in excess of 200° C. Another object of the invention is to provide a method and an apparatus in which the conductor ends are formed into a ball larger in diameter than the conductor wire and oriented so that large bonding force may be applied to the ball without danger of deforming the conductor whereby the bond is effected by a relatively large force and low temperature in the heat-compresison combination needed to complete a bond.

These, and other objects and advantages of the invention which will hereinafter appear, are realized in part by practicing the steps of: forming a mass of conductor material at one end of the conductor such that the dimensions of the mass exceed the cross-sectional area of the conductor; positioning the mass over the point to which it is to be bonded with the conductor extending laterally from the mass; applying bonding energy to the mass to complete a bond between the mass and the circuit, leading the conductor from that bond to a circuit point adjacent that point at which the connector wire is to terminate; severing the wire at that position; forming a second mass of conductor material at the other end of the conductor the diameter of which exceeds the cross-sectional area of the conductor and which overlies the point at which the bond is to be made; and, bonding the second mass to the second circuit point by the application of bonding energy to the second mass.

In the drawings:

FIG. 6 is an isometric, fragmented view of the thermocompression bonding tools and their supporting and control structures;

FIG. 7 is a top plan view of the thermocompression bonding tools and the control and supporting structure shown in fragmented form;

FIG. 8 is a diagram of control functions plotted against relative time illustrating the relationship of the several control functions employed in accomplishing the process of the invention;

FIG. 9 is a side view illustrating a completed electrical connection accomplished by prior art methods; and FIG. 10 is a view in side elevation of an electrical circuit connection accomplished according to the invention.

Figure 1:
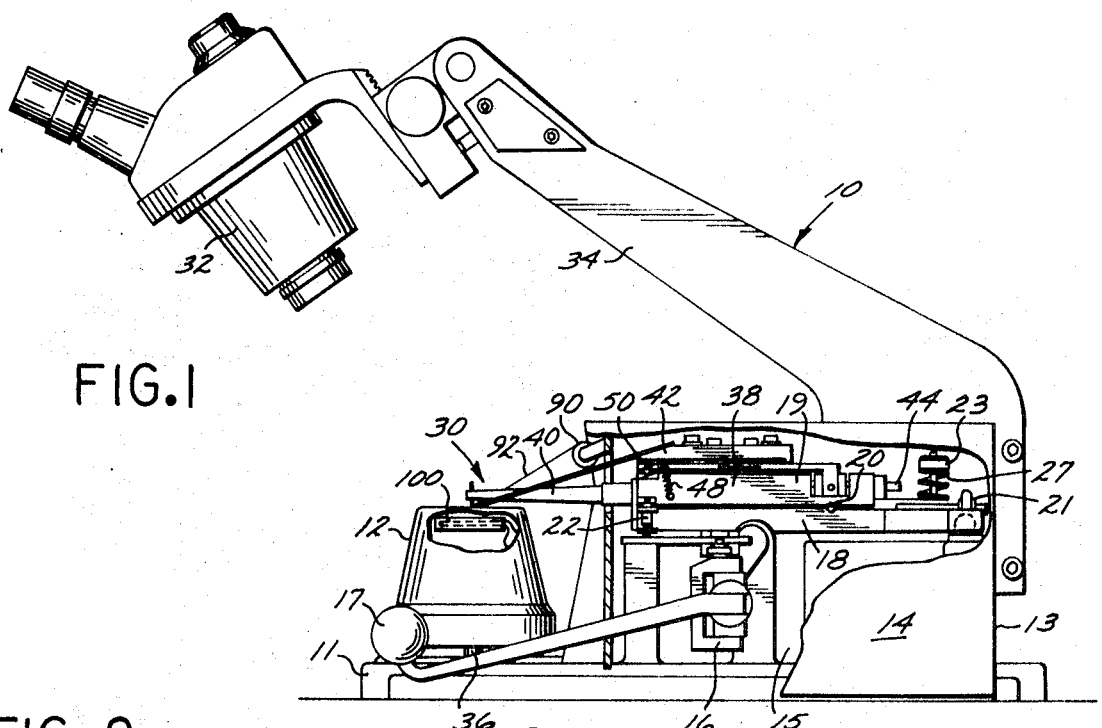
FIG. 1 is a view in side elevation of a bonding apparatus embodying the invention and which is capable of practicing the method of the invention, from which portions of the side walls have been broken away to reveal internal construction.

Referring to FIG. 1 of the drawings, there is shown a bonding machine generally designated 10 and comprising a base 11 upon which is mounted a work holder 12 and a bonding tool movement control structure generally designated 13. The cabinet 14 of the control unit 13 is broken away to expose a frame 15. Also visible is a pantograph mechanism 16 mounted upon the frame and including an input control lever 17 by which an operator is empowered to manipulate the position of a tool plate 18. The tool plate 18 is the output member of the pantograph system. In operation, the operator grasps the ball at the end of lever 17 and by moving the ball may move the tool plate up and down, in what is here designated as a "Z axis", toward and away from him, or to the left and to the right in FIG. 1 in what is designated as the "Y axis," or in a direction perpendicular to the drawing in FIG. 1 in what is designated here as the "X axis." A tool holder 19 is mounted upon the tooling plate and moves with the tooling plate in the X and Y directions. The tool holder 19 is pivotally mounted upon the tooling plate by a pivot pin 20 whose axis extends in the X direction. Means visible in FIG. 6, are provided, secure the tool holder to the pin and the pin to the tooling plate whereby the tool holder is fixed to the plate and all but relative rotational movement of the two about the pin 20 is precluded. In the particular embodiment selected for illustration in the drawings, the tooling plate pivots in the X, Y and Z directions about a ball socket joint 21 located at one end of the plate. The tools mounted upon tool holder 19 extend from the tool holder in a direction opposite the ball joint 21 to a position over the work stand 12. The bonding tools come to rest upon the work mounted at the top of the work stand when the tooling plate 18 and the tool holder 19 are lowered in the Y direction by lowering the ball at the end of lever 17. Downward movement of the tool plate is limited by an adjustable screw stop 22 which is threaded into the tooling plate and whose lower end abuts the frame 15. Because it is pivoted at ball joint 21 at one end, the weight of the tool plate will cause it to move downwardly in the Z direction so that stop screw 22 rests against the frame 15 except when the tool plate has been lifted by lifting of the ball at the end of lever 17. The tool holder 19 is a relatively heavy structure and the pivot pin 20 is located rearwardly a substantial distance from its center of gravity. Thus, the weight of the holder tends to force the bonding tools down upon the work. Means are provided for limiting the extent of this downward pressure. In this embodiment that means comprises a pressure adjustment screw 23. As best shown in FIG. 6, a threaded rod 24 extends upwardly from a connection to the tool plate 18 through a hole in a tail piece 25 connected to the rear of the tool holder 19 and is provided with a nut 26. The pressure spring 27 is trapped between the nut 26 and the tail piece 25 and its pressure is adjusted by adjusting the nut 26. When the tool piece 19 pivots downwardly about pivot 20 so that the bonding tools bear upon the work piece, the tail piece 25 pivots upwardly to compress the spring 27. Increasing the compression of the spring by adjustment of nut 26 decreases the pressure applied by the bonding tools to the work.

Summarizing, by manipulation of the ball at the end of lever 17 the operator of the bonding mechanism can move the work tools, generally designated 30 in FIG. 1, from side to side, back and forth, and up and down. Downward movement ceases when the tools 30 bear against a work piece mounted atop the work holder 12 and the pressure with which the tools bear upon the work piece is determined by the adjustment of stop screw 22 and the compression of pressure spring 27. These movements may be observed through the microscope 32 mounted above the work stand 12 upon an arm 34. Advantageously, as shown, the work stand is itself movable being mounted upon an adjustment mechanism 36 which is only partly visible in FIG. 1.

The tool holder 19 is divided into two major parts. One part, the lower part which is pivoted to pin 20 and is connected to the tall piece 25, is designated by the numeral 38. This part carries at its forward end (left in FIG. 1), a long tapered bonding tool holder 40. The upper portion 42 of the tool holder 19 is movable relatively to the lower portion in the Y direction at its rear end and in the Y–Z direction at its forward end. Referring to FIGS. 1 and 6, at its rear end the upper section 42 of the tool holder extends downwardly into a notch formed transversely in the lower portion 38 of the tool holder. The two sections, 38 and 42, are associated in the embodiment shown by a rod and piston arrangement actuated by air or gas pressure supplied through air fittings 44. Other motive means may be substituted of course. Upon the application of air pressure, the upper section 42 is moved forwardly relative to the lower section 38 in that the rod and piston arrangement forces the downwardly extending rear portion of the upper section 42 to move forwardly in the slot 46 of the lower section 38. At its front end the upper member 42 is held down toward the lower member 38 by a tension spring 48. At their forward ends the two sections 42 and 38 are separated by a pair of ball bearings, one on each side of the tool holder and one of which 50 is visible in FIG. 1. These bearings roll in inclined tracks one associated with member 42 and the other associated with member 38. When the upper member 42 is moved forwardly relative to the lower member 38 by the application of air pressure at fittings 44, it rolls over the ball bearings and down the inclined track so that the forward end of member 42 is carried downwardly as well as forwardly, down and left in FIG. 1.

A pair of tool holders designated by the numerals 52 and 54 are secured to the forward end of the upper section 42 and extend toward the outer end of the bonding tool holder 40. One tool holder, 52, extends downwardly past the bonding tool holder 40 to a position just below and behind the outer end of the bonding tool holder 40. It terminates at this point in a wire guide 56. In the embodiment selected for illustration in the drawings, the outer end of the compression tool holder 40 is bored perpendicularly through the tool holder and a pressure tool, called a ram or wedge ram, is fitted in that bore so that its lower end is disposed below the outer end of the compression tool holder 40. The construction of the ram is best shown in FIGS. 2–5. The ram is made of round stock. Its lower forward edge and its lower rear edge are ground away on a plane perpendicular to the drawing in FIGS. 3, 4 and 5 leaving a flat 60 at the lower end of the ram 58 which is used, as described below, to apply bonding pressure to a conductor. The rear surface 62 formed at the lower end of the ram 58 is formed on an angle which corresponds to the taper angle of the forward position of the wire guide 56. In operation of the bonding apparatus, the wire guide holder 52 is moved forward and downward as an incident to forward and downward motion of the upper section 42 of the tool holder 19 relative to the lower section 38 to carry the wire guide 56 to a position below the rear flat 64 of the ram with the forward portion of the wire guide adjacent the flat 60 of the ram.

The other tool holder 54 serves as the mounting and supporting structure for two tool elements. A gas tube 66, mounted upon the holder 54 terminates at its lower end in a gas nozzle 68 whose jet opening is directed generally immediately behind the pressure rod 58. Holder 54 also supports a two conductor, high tension cable 70 whose conductor ends 72 terminate at a point adjacent the path of gas flow from the nozzle 68.

The purpose of the method of the invention, and of the apparatus by which the method is practiced, is to connect an electrical conductor from one point in an electrical circuit to another. An example of the product of the method of the invention, and of the apparatus of the invention, is illustrated in FIG. 10. The numeral 76 designates an electrical conductor the ends of which are enlarged at 77 and 78. The enlarged portion 77 is bonded to a layer of conductor or semi-conductor material 79 and the enlarged portion 78 is bonded to a conductor or semi-conductor layer 80. The two layers 79 and 80 represent circuit runs or semi-conductor layers which are secured to a base 81 of insulating or semi-conductor material. Thus, the numerals 79, 80 and 81 represent the runs and base of a printed circuit board or they may represent semi-conductor slabs of an integrated circuit. In most applications of the invention, the surface of elements 79 and 80 which are exposed to the enlarged ends 77 and 78 of the conductor will comprise aluminum or gold and the conductor material will be gold. The invention is applicable to other materials but these materials are the common ones and usefulness of the invention is measured in part by its compatibility with such materials.

Some salient features of this construction are that the bond area between the conductor ends 77 and 78 and the circuit points 79 and 80 to which they are connected, is a large area relative to the cross-sectional area of the conductor wire 76. The enlarged ends are integrally formed on the conductor wire 76 and there is no deformation of the conductor wire at its juncture with the enlarged ends in the sense that the wire 76 is not pinched, its area is not diminished at the juncture with the enlarged end, and there is no extrusion or sharp bend to give rise to any internal strain in the conductor wire. The product of the prior art method and apparatus is illustrated in FIG. 9 where the numeral 82 represents the conductor to be used to join a circuit point 83 with a circuit point 84. Here the conductor 82 has been provided with an enlargement at each end. The enlargement at the left is generally designated 85. The bond between it and the circuit point 83 has the advantage that it extends over a substantial area much larger than the cross-sectional area of the conductor wire itself. However, the bond is created by downward pressure of a ram which has a central opening through which the conductor wire extends. The area of the junction between the conductor and its enlarged end is considerably deformed, it includes an extruded area, and the juncture lies above the enlarged end so that the conductor wire must extend vertically upward from the bond as shown. The conductor is led to the circuit point 84 and the bond is accomplished by mashing the conductor down upon the circuit point with the result that the wire is pinched, flattened and nicked. In the prior art method the second bond is accomplished at a point removed from the enlarged end 86 and deformation of the wire during bonding results in a strain that causes the enlarged end 86 to be raised up, as shown, away from the circuit point 82 to remain as an upstanding tail when the bond is complete. It is readily apparent that the product illustrated in FIG. 9 of the prior art method is much less strong, and is adversely affected in greater degree by vibration and shock than is the product of the invention shown in FIG. 10.

Figure 5:
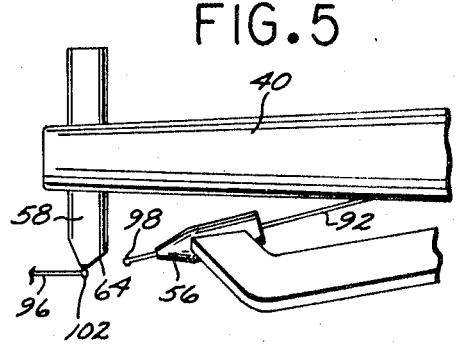
FIG. 5 is a view of the elements shown in FIGS. 3 and 4 illustrating the condition of the conductor following flame cutting of the conductor and prior to bonding of the severed conductor.

Returning to FIG. 1 of the drawing, the conductor wire is advantageously stored on a spool 90 secured to the front panel of the control unit 13. The wire, designated by the numeral 92, extends from the spool down through an opening 94 in the bonding tool holder 40. The hole 94 is aligned with the upper edge of spool 90 and the bore 96 of the wire guide. The wire is threaded through the guide hole 94 and the wire guide hole 96 in wire guide 56 until it extends forwardly from the forward end of the wire guide. Pressurized gas, usually hydrogen, is released from the gas nozzle 68 and it is ignited by a spark between ignition wires 72. The result is a flame reaching to the conductor wire 92. The flame is sufficiently hot to melt and sever the wire and it is sufficiently hot to heat a relatively large volume, length of the wire, above the melting point so that a ball of conductor material is formed at each end of the severed conductor by the action of surface tension. Immediately after severance, the wire ends appear as they do in FIG. 5. FIG. 5 is intended to depict both the initial severance of the wire to form a ball at the end of conductor 92 to begin the wiring process and it is also employed to depict a later stage in which the severed portion 96, of the conductor wire represents a length of conductor whose other end already has been connected to a circuit point.

Figure 2:
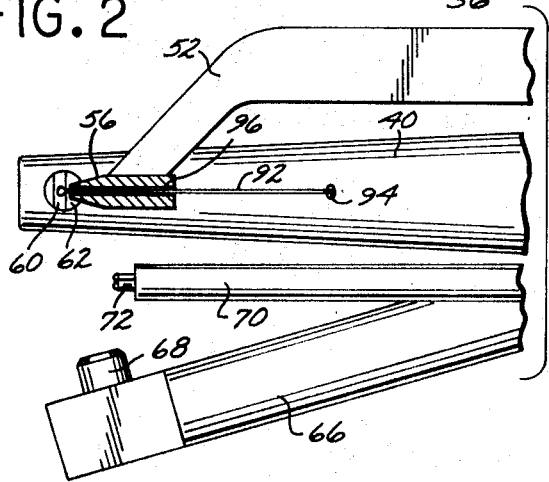
FIG. 2 is a fragmented bottom, plan view of the foremost portions of the wire forming and bonding tool elements of the structure of FIG. 1 including a pressure ram, a pressure ram holder, the wire guide, a gas flame torch and a gas igniter.
Figure 3:
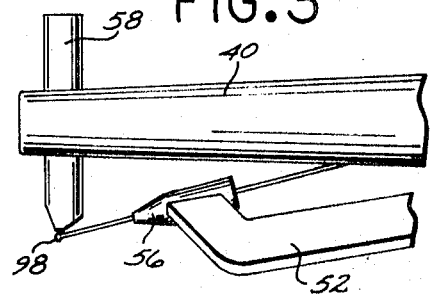
FIG. 3 is a view in side elevation of the pressure ram and wire guide illustrating how the wire is positioned when ready for bonding.
Figure 4:
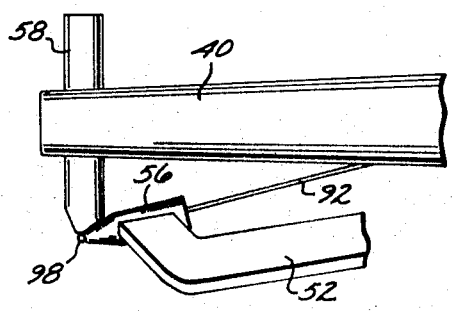
FIG. 4 is a view of the structures of FIG. 3 illustrating how the wire guide is employed to move the wire to the position it occupies in FIG. 3.

The result of the initial "flame-off" step has been to form a ball 98 at the end of conductor wire 92 at a position somewhat removed from the forward end of the guide 56 and between the guide and the welding ram 58. The next step is to extend the wire 92 so that the ball 98 is positioned immediately below the flat 60 of the ram 58 so that the ball may be welded to a circuit point by the application of pressure to the ball with the ram. Referring to FIG. 2 of the drawings, the bore 96 in the wire guide has diameter sufficiently large to accommodate the conductor wire 92 but is too small to accommodate the ball 98 at the end of the conductor wire. Accordingly, conductor wire 92 may be pulled from the spool sufficiently so that ball 98 underlies flat 60 of the ram by a forward motion of the wire guide relative to the ram 58. The stroke or degree of relative motion between the upper portion 42 and the lower portion 38 of the tool holder 19 is adjusted so that upon the application of air pressure at fitting 44 the wire guide 56 is moved forward to the position shown in FIG. 4. Thereafter, air pressure is removed from fitting 44 and the wire guide is retracted to the position shown in FIG. 3 when the tool holder sections 42 and 38 are returned to initial position by the action of spring 48. Lever 17 may then be actuated to move the ram and the ball 98 together to any position above a work piece disposed upon the work stand 12. When the ball 98 overlies the attachment point, the lever 17 is lowered so that the ball is lowered to the attachment point and so that the flat 60 of ram 58 presses down upon the ball as previously described to effect a bond between the ball and the circuit point to which it is to be connected. A portion of the tool holder 12 is broken away in FIG. 1 to disclose that the work piece is heated by a heater 100 in a degree sufficient when combined with the pressure applied at ram 58 to effect the requisite bond. At the end of this step the ball 98 will have been compressed against the circuit point to which it is bonded so that it looks like the enlarged portions 77 of the conductor wire 76 in FIG. 10. The first bond having been completed, lever 17 is operated to lift the ram 58 from ball 98 and to move it to a position overlying the circuit point at which the other end of the conductor is to be attached. When the ram occupies that position, the conductor wire is severed as before by permitting a flow of gas from nozzle 68 to be ignited by the ignition spark wire 72 with the result that the wire is severed and a ball is formed at the end of the conductor wire that was paid out when the ram was moved to the second circuit point. The condition at this stage is illustrated in FIG. 5. The numeral 96 designates the portion of conductor wire 92 that was severed from the length of feed wire. The ball 102 at the end of wire 96 is formed by the action of surface tension as previously described. Advantageously, the flame position is adjusted so that ball 102 is formed immediately below the flat 60 of the ram 58. Even if it does not underlie flat 60 exactly as required it will overlie the point at which the second circuit connection is to be completed and the ram may be moved to proper position by manipulation of lever 17. When the ram overlies the ball 102 it is lowered by lowering the lever 17 so that pressure will be applied to the top of ball 102 and cause it to be welded at the second circuit point. At this stage the ball 102 will have an appearance corresponding to that of enlargement 78 of the wire 76 in FIG. 10. When the bond is complete the ram 58 is lifted away by lifting lever 17 and the new ball on the standing part of the feed wire 92 may be positioned beneath the flat 60 of ram 58 to begin the next circuit run by application of air pressure at fitting 44 to move the wire guide forward and carry the new ball under the ram.

The air pressure, the jet of gas from nozzle 68, and the step of ignition by creating a spark at the end of wires 72, may be initiated manually independently of movement of lever 17 and in this preferred embodiment of the invention means are provided by which these functions can be accomplished manually independently of lever position. However, in this preferred embodiment provision is also made for accomplishing initiating some of these actions automatically by sensing movement of the tool as a result of operation of lever 17. To that end, the tool control mechanism incorporates a plurality of sensors which provide control signals as an incident to movement or manual manipulation of the tool. As best shown in FIG. 7, the embodiment of the invention selected for illustration in the drawings includes three microswitches 104, 106 and 108 which are arranged so that their actuating levers, 110, 112 and 114, respectively, are disposed below the tooling plate 18 where they are actuated by the lower ends of actuator screws 116, 118 and 120, respectively. These three screws extend through the tooling plate so that they have the positions relative to the actuating levers of the micro switches shown in FIG. 7 when the ram 58 is positioned centrally over its work area. The three microswitches 104, 106 and 108 are all fixed relative to the base and frame of the bonding machine. Their actuating levers 110, 112 and 114 are actuated by movement in the Z direction. The three actuating screws 116, 118 and 120 are fixed to tooling plate 18 which is movable relatively to the three microswitches. The lower end of actuating screw 118 is adjusted to a height so that it actuates the lever 112 of microswitch 106 only when lever 17 is lowered to bring the ram 58 to a point relatively close to the surface of the workpiece. The lower end of actuating screw 116 actuates the lever 110 of microswitch 104 when the tool plate is lowered and moved carry the tool to or rearwardly of its central work position. The lower end of screw 120 is positioned to actuate the lever 114 of microswitch 108 only when the tool plate is lowered and is moved to carry the tools to a position at or forward of the central working position. The relationship of microswitch actuation and the several tool functions is illustrated in FIG. 8. The lower three curves illustrate actuation of the microswitches in time, when the ram 58 is moved by lever 17 in the manner depicted in the upper curve of FIG. 8. Beginning at the left in FIG. 8 at zero relative time, the uppermost curve begins at search level and indicates that lever 17 has been raised sufficiently so that actuating screw 108 clears the control lever 112 of switch 106 while the tools are moved in the X and Y directions to locate them over the point at which the first circuit connection is to be made. When the ram occupies a position overlying the point at which the first bond is to be effected lever 17 is lowered to the lock position at which the actuating screw 118 depresses switch actuator 112 sufficiently to actuate the switch 106. At this time switch 106 is actuated as depicted in the lower graph of FIG. 8. Further lowering of the lever 17 brings the ram 58 to rest upon the ball to complete the bond at the first joint. When the ram is first lowered to this position, the bond position in the uppermost curve of FIG. 8, gas pressure is applied and gas is permitted to escape from nozzle 68 as shown by the gas curve in FIG. 8. This is in response to actuation of the microswitch 108 as shown in curve 108 of FIG. 8. Returning to the uppermost curve of FIG. 8, after the bond is completed the ram is lifted from the work back up to search position in which the tools are moved in the X and Y directions until the ram overlies the point at which the second bond is to be made. During this movement, wire is paid out as required until the ram is brought to rest in a position overlying the position of the second bond. Then, as shown in the uppermost curve of FIG. 8, the lever 17 is lowered from search position through the lock position to the bond position. As the lever, and the bonding ram 58, approach the lock position relay 106 is actuated for the second time whereby to permit actuation of relay 104 which turns off the flow of gas and simultaneously causes an igniting spark to jump between the ignitor wires 72. The turn off of gas and the occurrence of the flame are depicted in the gas and flame curves of FIG. 8, respectively. The lever 17 and the ram 58 having been lowered to the bonding position the thermocompressive bond is formed. After completion of the bond the lever 17 is again lifted. As the lever is lifted to raise the tooling plate 18, screw 116 is lifted to clear the actuating lever 110 of switch 104. Continued upward movement of the lever 17 and of the tooling plate 18 carries the end of actuating screw 110 away from lever 112 of the microswitch 106 so that this switch is actuated. The actuation of these two switches, 104 and 106, signals the application of a pulse of air or gas at fitting 44 whereby the wire guide 56 is moved forwardly to position the new ball formed by the severing flame to a point beneath the flat 60 of the bonding ram 58.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. The method of accomplishing electrical connections from one circuit point to another by a conductive wire threaded through and protruding from a wire guide by the employment of a bonding energy applying ram, comprising the steps of:
    (a) forming, integrally with a conductor wire from the material of the wire and at an end of said wire protruding from a wire guide, a ball having cross-sectional area exceeding that of the wire;
    (b) positioning said ball in the path of movement of said movable ram so that the conductor upon which the ball is formed extends laterally from said path;
    (c) positioning the ball and ram together relative to a first one of said circuit points such that said ball and said first one of said circuit points lie in the path of movement of said ram;
    (d) bonding the ball to said one of said circuit points by the application of bonding energy to the ball by the ram by movement of the ram along the path of its movement;
    (e) leading the conductor from the bond so formed to a position adjacent a second one of said circuit points;
    (f) severing said conductor at said position adjacent said second circuit point and forming, integrally with said conductor at the end opposite said first ball, a second ball having diameter exceeding the cross-sectional area of said conductor;
    (g) positioning said ram relative to said second ball and said second circuit point such that its path of motion extends through said ball to said second point and such that the conductor extends from said second ball in a direction lateral to the path of motion of said ram;
    (h) moving said ram to bond said ball to said second circuit point by the application of bonding energy to said second ball.

2. The invention defined in claim 1, in which said conductor is severed at a point removed from the path of movement of said ram sufficiently so that the ball formed by the action of surface tension solidifies in a position in the path of movement of said ram.

3. Apparatus for accomplishing wiring of electrical circuits mounted upon a work station, comprising in combination:
    (a) a tool holder;
    (b) a welding ram carried by the tool holder and reciprocably movable along a path of action;
    (c) a conductor wire guide carried by the tool holder and having a guide opening of size to accommodate a conductor wire, the guide opening of which is formed along a line intersecting said path of action;
    (d) means carried by the tool holder for severing the conductor wire and for forming a ball of conductor material at each of the severed ends comprising means for applying to a conductor wire extending from said guide opening a quantity of heat sufficient to melt the conductor wire over a length sufficient to result in its severance and the formation of a ball at the severed end at a point outside the line of action of the welding ram;
    (e) and means carried by said tool holder for moving said wire guide relative to a wire extending therethrough and into engagement with said ball and thereafter to move said ball and the conductor together to a position in which said ball lies in said path of action of said welding ram.

4. The invention defined in claim 3 in which said ram is mounted for vertical movement and said wire guide opening is directed laterally and downwardly toward the path of movement of said ram and in which said means for severing the conductor comprises means for directing a jet of gas at said wire for a period beginning after said ram is lifted from its lowermost position and terminating prior to the return of the ram to said lowermost position; and in which said means for moving said wire guide relative to the wire extending therethrough is mounted for movement with said ram whereby said ball, following movement of said ball to a position in the path of movement of said ram, is movable together with said ram relative to said work station; means for sensing movement of said ram to a position to one side and the other of a central ram position; and means responsive to lifting of said ram and movement to one side for directing a jet of gas at said wire; and means for igniting said jet of gas.

5. The invention defined in claim 3 including means for retracting said wire guide along the conductor out of engagement with said ball without withdrawal of said ball from the path of action of the ram; and means for moving said ram to selected positions on opposite sides of the mid region of said work station and means sensitive to lifting of the ram from a position adjacent the work stand either at or at one side of said mid region for actuating said means for moving said wire guide to move said ball to a position in the path of movement of the ram.

References Cited

UNITED STATES PATENTS

| 3,389,457 | 6/1968  | Goldman et al.  | 29—471.1 X |
| 3,430,835 | 3/1969  | Grable et al.   | 29—591 X   |
| 3,006,067 | 10/1961 | Anderson et al. | 29—470     |
| 3,328,875 | 7/1967  | Pennings        | 228—1 X    |
| 3,357,090 | 12/1967 | Tiffany         | 228—1 X    |
| 3,459,355 | 8/1969  | Metzger, Jr.    | 228—1      |

CHARLIE T. MOON, Primary Examiner

R. W. CHURCH, Assistant Examiner

U.S. Cl. X.R.

29—471.1, 470.1, 470.3, 628; 140—111; 219—80, 137; 228—1, 3, 5, 13